United States Patent
Shieh et al.

(10) Patent No.: US 12,123,752 B2
(45) Date of Patent: Oct. 22, 2024

(54) ANGLE SENSING DEVICE

(71) Applicants: Chia-Chih Shieh, New Taipei (TW); Yi Rong, Beijing (CN)

(72) Inventors: Chia-Chih Shieh, New Taipei (TW); Yi Rong, Beijing (CN)

(73) Assignee: iSentek Inc., New Taipei (TW)

( * ) Notice: Subject to any disclaimer, the term of this patent is extended or adjusted under 35 U.S.C. 154(b) by 157 days.

(21) Appl. No.: 18/166,498

(22) Filed: Feb. 9, 2023

(65) Prior Publication Data
US 2024/0219206 A1    Jul. 4, 2024

(30) Foreign Application Priority Data

Dec. 30, 2022    (TW) .................................. 111150933

(51) Int. Cl.
*G01D 5/14* (2006.01)
*G01D 11/24* (2006.01)

(52) U.S. Cl.
CPC ........... *G01D 5/145* (2013.01); *G01D 11/245* (2013.01); *G01D 2205/40* (2021.05)

(58) Field of Classification Search
CPC ... G01D 5/145; G01D 11/245; G01D 2205/40
See application file for complete search history.

(56) References Cited

U.S. PATENT DOCUMENTS 8,339,123 B2 * 12/2012 Chen ...................... G01C 17/30
                                                          702/92
9,571,614 B2 *  2/2017 Jin ......................... G06F 1/1626
(Continued)

FOREIGN PATENT DOCUMENTS

| CN | 103565064 | 2/2014 |
|----|-----------|--------|
| CN | 104102288 | 10/2014 |
| CN | 103582364 | 12/2016 |

(Continued)

OTHER PUBLICATIONS

"Office Action of Taiwan Counterpart Application", issued on Feb. 20, 2024, p. 1-p. 7.

(Continued)

*Primary Examiner* — Jermele M Hollington
*Assistant Examiner* — Zannatul Ferdous
(74) *Attorney, Agent, or Firm* — JCIPRNET

(57) ABSTRACT

An angle sensing device including a first cover body, a second cover body, a rotating mechanism, a first magnetic element, a second magnetic element, a first magnetic sensor, a second magnetic sensor, and a controller is provided. The first magnetic sensor is configured to sense a magnetic field generated by the first magnetic element. The second magnetic sensor is disposed on an end of the first cover body away from the rotating mechanism corresponding to a position of the second magnetic element, and is configured to generate an auxiliary signal when the second magnetic element approaches. The controller receives the magnetic field sensed by the first magnetic sensor to calculate an included angle between the second cover body and the first cover body. The controller judges whether the second cover body and the first cover body are in a closed state or an open state according to the auxiliary signal and the calculated included angle.

9 Claims, 2 Drawing Sheets

(56) References Cited

U.S. PATENT DOCUMENTS

2016/0275648 A1    9/2016  Honda et al.
2017/0205250 A1*   7/2017  Aichriedler ............ G01D 5/145

FOREIGN PATENT DOCUMENTS

| CN | 110360922 | 3/2021 |
| CN | 115060158 | 9/2022 |
| EP | 3371675   | 4/2021 |
| JP | 2006220556 | 8/2006 |
| JP | 2016148643 | 8/2016 |

OTHER PUBLICATIONS

"Notice of allowance of Taiwan Counterpart Application", issued on Jul. 29, 2024, p. 1-p. 5.

* cited by examiner

ANGLE SENSING DEVICE

CROSS-REFERENCE TO RELATED APPLICATION

This application claims the priority benefit of Taiwan application serial no. 111150933, filed on Dec. 30, 2022. The entirety of the above-mentioned patent application is hereby incorporated by reference herein and made a part of this specification.

BACKGROUND

Technical Field

The disclosure relates to a sensing device, and more particularly, to an angle sensing device.

Description of Related Art

An angle sensing device is applied to foldable electronic products, such as foldable mobile phones or notebook computers, which in addition to sensing an angle between cover bodies, may also light up a screen when the cover bodies are opened, or turn off the screen and close APPs when the cover bodies are closed.

In the existing angle sensing device, a reference magnet is placed on an axis, and a three-axis magnetic sensor is placed on the cover body corresponding to the axis. The angle between the cover bodies may be calculated by sensing a change of a magnetic field. However, such a design has the following disadvantages.

First, there are strict requirements for structural materials around the reference magnet and the magnetic sensor to avoid misjudgment of the angle caused by the residual magnetic effect. However, the selection of the materials results in increased production costs. In addition, even stainless steel materials will have a small residual magnetic effect, which will still have a great impact on the judgment of the angle.

Second, tolerances of system manufacturing and assembly will cause deviations in the sensed magnetic field. Therefore, calibration of the angle is required before the product leaves the factory, which costs a lot of money.

Third, interference of an external magnetic field source will make detection of the angle of the system invalid. Therefore, the system is required to be designed in such a way that the system may be unlocked only after the interference of the external magnetic field source is removed. However, there are often magnetic field sources in a usage environment, such as earphones, speakers, magnetic pens, magnetic connectors, etc. Therefore, the use of the angle sensing device excessively limits usage scenarios of a user.

SUMMARY

The disclosure provides an angle sensing device, which may better judge the closed or open state between cover bodies.

An embodiment of the disclosure provides an angle sensing device, including a first cover body, a second cover body, a rotating mechanism, a first magnetic element, a first magnetic sensor, a second magnetic sensor, and a controller. The rotating mechanism is connected to the first cover body and the second cover body to enable the second cover body to rotate relative to the first cover body. The first magnetic element is disposed in the rotating mechanism. The second magnetic element is disposed on an end of the second cover body away from the rotating mechanism. The first magnetic sensor is disposed in the first cover body to sense a magnetic field generated by the first magnetic element. The second magnetic sensor is disposed on an end of the first cover body away from the rotating mechanism corresponding to a position of the second magnetic element, and is configured to generate an auxiliary signal when the second magnetic element approaches. The controller is electrically connected to the first magnetic sensor and the second magnetic sensor. The controller receives the magnetic field sensed by the first magnetic sensor to calculate an included angle between the second cover body and the first cover body. The controller judges whether the second cover body and the first cover body are in a closed state or an open state according to the auxiliary signal and the calculated included angle.

Based on the above, in an embodiment of the disclosure, in addition to using the magnetic field sensed by the first magnetic sensor to calculate the included angle between the second cover body and the first cover body, the angle sensing device also judges whether the second cover body and the first cover body are in the closed state or the open state according to the auxiliary signal of the second magnetic sensor and the calculated included angle. Therefore, the second magnetic sensor may provide the system auxiliary signal when the system is under the interference of the external magnetic field source or the residual magnetic effect generated after the interference of the external magnetic field source, so that the angle sensing device may better judge the closed or open state between the cover bodies.

DETAILED DESCRIPTION OF DISCLOSED EMBODIMENTS

Figure 1:
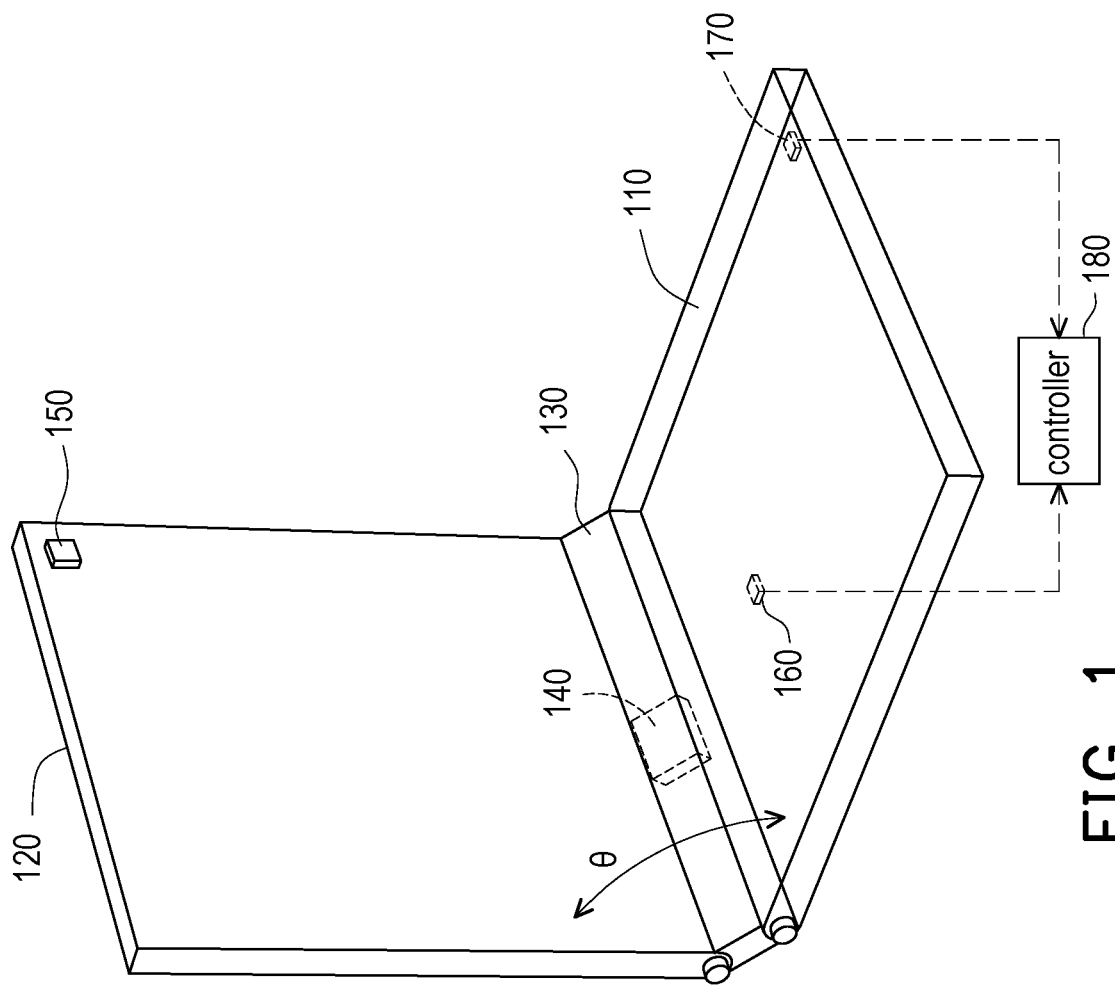
FIG. 1 is a schematic view of an angle sensing device according to an embodiment of the disclosure.

FIG. 1 is a schematic view of an angle sensing device according to an embodiment of the disclosure. Referring to FIG. 1, in an embodiment of the disclosure, an angle sensing device 10 is provided, including a first cover body 110, a second cover body 120, a rotating mechanism 130, a first magnetic element 140, a second magnetic element 150, a first magnetic sensor 160, a second magnetic sensor 170, and a controller 180.

In this embodiment, the first cover body 110 or the second cover body 120 may be an upper cover or a lower cover of a foldable mobile phone, a notebook computer, or other foldable electronic systems. The second cover body 120 is adapted to rotate relative to the first cover body 110.

In this embodiment, the rotating mechanism 130 is, for example, a hinge, but the disclosure is not limited thereto. The rotating mechanism 130 is connected to the first cover body 110 and the second cover body 120 to enable the second cover body 120 to rotate relative to the first cover body 110.

In this embodiment, the first magnetic element 140 and the second magnetic element 150 are, for example, magnets. The first magnetic sensor 160 may be a three-axis magnetic sensor, and the second magnetic sensor 170 may be a Hall switch. The first magnetic element 140 is disposed in the rotating mechanism 130. The second magnetic element 150 is disposed on an end of the second cover body 120 away from the rotating mechanism 130. The first magnetic sensor 160 is disposed in the first cover body 110 to sense a magnetic field generated by the first magnetic element 140.

In this embodiment, the second magnetic sensor 170 is disposed on an end of the first cover body 110 away from the rotating mechanism 130 corresponding to a position of the second magnetic element 150 to generate an auxiliary signal when the second magnetic element 150 approaches (the second cover body 120 is rotated). The above approach may be defined as an angle θ between the first cover body 110 and the second cover body 120 less than or equal to 5 degrees, but the disclosure is not limited thereto. In order to prevent magnetic force of the second magnetic element 150 from affecting accuracy of the first magnetic sensor 160 sensing the magnetic field generated by the first magnetic element 140, a magnetic field generated by the second magnetic element 150 is preferably smaller than the magnetic field generated by the first magnetic element 140.

In this embodiment, the controller 180 includes, for example, a central processing unit (CPU), a microprocessor, a digital signal processor (DSP), a programmable controller, a programmable logic device (PLD), other similar devices, or a combination of these devices. However, the disclosure is not limited thereto. In addition, in an embodiment, each of functions of the controller 180 may be implemented as multiple program codes. The program codes are stored in a memory unit, and are executed by the controller 180. In addition, in an embodiment, each of the functions of the controller 180 may be implemented as one or more circuits. The disclosure does not limit the implementation of each of the functions of the controller 180 by means of software or hardware.

In this embodiment, the controller 180 is electrically connected to the first magnetic sensor 160 and the second magnetic sensor 170. The controller 180 receives the magnetic field sensed by the first magnetic sensor 140 to calculate the angle θ between the second cover body 120 and the first cover body 110. In addition, the controller 180 judges whether the second cover body 120 and the first cover body 110 are in a closed state or an open state according to the auxiliary signal and the calculated included angle θ.

Figure 2:
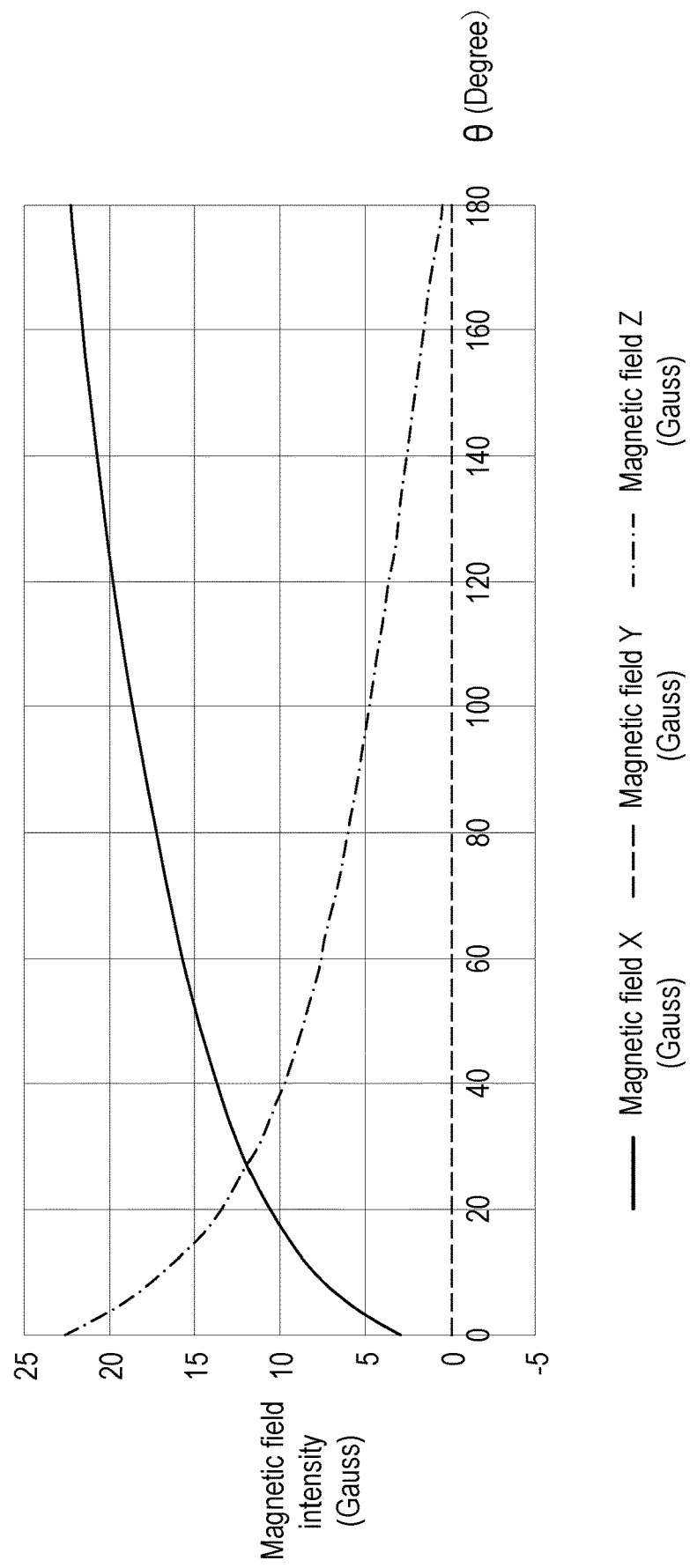
FIG. 2 is a graph of a magnetic field sensed by a first magnetic sensor in an angle sensing device according to an embodiment of the disclosure.

FIG. 2 is a graph of a magnetic field sensed by a first magnetic sensor in an angle sensing device according to an embodiment of the disclosure. An X axis in FIG. 2 is the included angle θ between the first cover body 110 and the second cover body 120, and a Y axis is magnetic field intensity sensed by the first magnetic sensor 160, which includes the magnetic field intensity in X. Y. and Z directions (directions of X, Y, and Z axes as shown in FIG. 1). FIG. 2 shows the magnetic field sensed by the first magnetic sensor 160 under ideal conditions, and the included angle θ may be obtained by calculating arctan (Bx, Bz), where Bx is the magnetic field in the X direction, and Bz is the magnetic field in the Z direction. When the system is disturbed by an external magnetic field source, the magnetic field sensed by the first magnetic sensor 160 generates a deviation, and at the same time, the included angle θ calculated by the controller 180 is inaccurate. Therefore, the auxiliary signal is used to assist the controller 180 in judging whether the second cover body 120 and the first cover body 110 are in the closed state or the open state.

In detail, in this embodiment, when the controller 180 receives the auxiliary signal, and the included angle θ is greater than a first critical angle, the controller 180 judges that the second cover body 120 and the first cover body 110 are not in the closed state. In addition, when the controller 180 receives the auxiliary signal, and the included angle θ is less than or equal to the first critical angle, the controller 180 judges that the second cover body 120 and the first cover body 110 are in the closed state. The first critical angle may be set to 120, 150 degrees, etc. In addition, when the included angle θ calculated by the controller 180 is less than or equal to a second critical angle, but the second magnetic sensor 170 does not generate the auxiliary signal, the controller 180 judges that the second cover body 120 and the first cover body 110 are in the open state. That is to say, the external magnetic field source interferes with the sensing accuracy of the first magnetic sensor 160, so that signals sensed by the first magnetic sensor 160 and the second magnetic sensor 170 are inconsistent. At this time, the controller 180 preferentially selects the signal sensed by the second magnetic sensor 170 to judge whether the second cover body 120 and the first cover body 110 are in the closed state or the open state.

In this embodiment, when the controller 180 receives the auxiliary signal, and the included angle θ is less than or equal to the second critical angle (at this time, the system judges that the second cover body 120 and the first cover body 110 are in the closed state), the controller 180 calculates an offset of 0 degrees according to a magnetic field value of 0 degrees in standard parameters and the magnetic field sensed by the first magnetic sensor 160. The second critical angle may be set to 5 degrees.

In this embodiment, the standard parameters may be the magnetic field values corresponding to different included angles θ calculated by multiple different angle sensing devices during production. For example, the standard parameters may include magnetic field values Bx and Bz when the included angle θ is 0, 30, 60, 90, 120, 150, and 180 degrees respectively. The standard parameters may be stored in the system, for example in the memory unit of the controller 180. The standard parameters may be applied to other angle sensing devices. That is to say, during the production, the angle sensing device 10 is not required to be calibrated, and only the standard parameters are required to be directly stored in the system.

For example, when the auxiliary signal is received, and the included angle θ is less than or equal to the second critical angle (at this time, the system judges that the second cover body 120 and the first cover body 110 are in the closed state), at this time, the controller 180 reads magnetic fields Bx and Bz sensed by the first magnetic sensor 160, and subtracts magnetic field values Bx(0) and Bz(0) of 0 degrees in the standard parameters from the magnetic fields Bx and Bz, so as to obtain offsets Bx_offset and Bz_offset of 0 degrees. The system may calculate the new offsets Bx_offset and Bz_offset of 0 degrees each time the second cover body 120 and the first cover body 110 are detected to be in the closed state. Afterwards, at regular intervals, such as 0.1, 0.5, 1 second, etc., the system recalculates the offsets Bx_offset and Bz_offset of 0 degrees.

In addition, in this embodiment, when the second cover body 120 and the first cover body 110 are in the open state (determined by the controller 180), the controller 180 calibrates the calculated included angle θ between the second cover body 110 and the first cover body 120 according to the offset of 0 degrees and the magnetic field sensed by the first magnetic sensor 160. A calibration method is, for example, subtracting the offsets Bx_offset and Bz_offset of 0 degrees from the magnetic fields Bx and Bz sensed by the first magnetic sensor 160, and then calculating the included angle θ, so as to obtain the calibrated included angle θ.

Based on the above, in an embodiment of the disclosure, the angle sensing device includes the first cover body, the second cover body, the rotating mechanism, the first magnetic element, the second magnetic element, the first magnetic sensor, the second magnetic sensor, and the controller. In addition to using the magnetic field sensed by the first magnetic sensor to calculate the included angle between the second cover body and the first cover body, the angle sensing device also judges whether the second cover body and the first cover body are in the closed state or the open state according to the auxiliary signal of the second magnetic sensor and the calculated included angle. Therefore, the second magnetic sensor may provide the system auxiliary signal when the system is under the interference of the external magnetic field source or the material around the magnetic sensor has residual magnetism with an undetermined direction and intensity, so that the angle sensing device may repair the effect to better judge the closed or open state between the cover bodies. In addition, when the distance between the first magnetic sensor and the second magnetic sensor is sufficient, and only one of the magnetic sensors is disturbed, the system may perform intersection and union on results of analyzing the signals obtained by the first magnetic sensor and the second magnetic sensor, so that the system may still judge the closed or open state. Therefore, the user experience is better.

In addition, the angle sensing device may further pre-write a set of statistical standard parameters, and use the auxiliary signal and the standard parameters to further calibrate the included angle between the second cover body and the first cover body calculated by the controller. Therefore, the electronic product adopting the angle sensing device in the embodiment of the disclosure may automatically complete the angle calibration after the procedure of the system automatically repairing the residual magnetism, and further optimizes the user experience. In addition, when the Hall sensor converts a sensed voltage into the magnetic field intensity, different deviation values and conversion slopes are generated with different temperatures. Therefore, the offset of 0 degrees calculated by the standard parameters also indirectly repairs the effect of temperature drift of the Hall sensor, thereby improving the accuracy of angle detection when the user uses the angle sensing device in different weather and ambient temperatures.

What is claimed is:

1. An angle sensing device, comprising:
a first cover body;
a second cover body;
a rotating mechanism connected to the first cover body and the second cover body to enable the second cover body to rotate relative to the first cover body;
a first magnetic element disposed in the rotating mechanism;
a second magnetic element disposed on an end of the second cover body away from the rotating mechanism;
a first magnetic sensor disposed in the first cover body to sense a magnetic field generated by the first magnetic element;
a second magnetic sensor disposed on an end of the first cover body away from the rotating mechanism corresponding to a position of the second magnetic element, and is configured to generate an auxiliary signal when the second magnetic element approaches; and
a controller electrically connected to the first magnetic sensor and the second magnetic sensor,
wherein the controller receives the magnetic field sensed by the first magnetic sensor to calculate an included angle between the second cover body and the first cover body,
wherein the controller judges whether the second cover body and the first cover body are in a closed state or an open state according to the auxiliary signal and the calculated included angle.

2. The angle sensing device according to claim 1, wherein the second magnetic sensor is a Hall switch.

3. The angle sensing device according to claim 1, wherein a magnetic field generated by the second magnetic element is smaller than the magnetic field generated by the first magnetic element.

4. The angle sensing device according to claim 1, wherein when the controller receives the auxiliary signal, and the included angle is greater than a first critical angle, the controller judges that the second cover body and the first cover body are not in the closed state.

5. The angle sensing device according to claim 4, wherein the first critical angle is 150 degrees.

6. The angle sensing device according to claim 1, wherein when the controller receives the auxiliary signal, and the included angle is less than or equal to a second critical angle, the controller calculates an offset of 0 degrees according to a magnetic field value of 0 degrees in standard parameters and the magnetic field sensed by the first magnetic sensor.

7. The angle sensing device according to claim 6, wherein the second critical angle is 5 degrees.

8. The angle sensing device according to claim 6, wherein when the second cover body and the first cover body are in the open state, the controller calibrates the calculated included angle between the second cover body and the first cover body according to the offset of 0 degrees and the magnetic field sensed by the first magnetic sensor.

9. The angle sensing device according to claim 1, wherein when the included angle calculated by the controller is less than or equal to a second critical angle, but the second magnetic sensor does not generate the auxiliary signal, the controller judges that the second cover body and the first cover body are in the open state.

* * * * *